United States Patent
Lilly, Jr. et al.

(10) Patent No.: US 6,848,450 B2
(45) Date of Patent: Feb. 1, 2005

(54) CIGARETTE FILTER USING INTERMETALLIC COMPOUNDS

(75) Inventors: A. Clifton Lilly, Jr., Chesterfield, VA (US); Kent B. Koller, Chesterfield, VA (US); John B. Paine, III, Midlothian, VA (US); Purusottam Jena, Richmond, VA (US); Bijan K. Rao, Richmond, VA (US)

(73) Assignee: Philip Morris USA Inc., Richmond, VA (US)

(*) Notice: Subject to any disclaimer, the term of this patent is extended or adjusted under 35 U.S.C. 154(b) by 99 days.

(21) Appl. No.: 09/778,043

(22) Filed: Feb. 7, 2001

(65) Prior Publication Data

US 2002/0014453 A1 Feb. 7, 2002

Related U.S. Application Data

(60) Provisional application No. 60/180,681, filed on Feb. 7, 2000, now abandoned.

(51) Int. Cl.⁷ .................................................. A24D 3/00
(52) U.S. Cl. ...................... 131/334; 131/339; 131/360; 131/361
(58) Field of Search ........................... 210/504, 505; 131/88, 200, 201, 202, 203, 331, 332, 334, 339, 360, 361, 365, 374; 102/139

(56) References Cited

U.S. PATENT DOCUMENTS

| | | | | | |
|---|---|---|---|---|---|
| 3,647,721 | A | * | 3/1972 | Salyer et al. | 106/122 |
| 3,716,063 | A | * | 2/1973 | Litzinger | 131/267 |
| 3,878,854 | A | * | 4/1975 | Albein et al. | 131/331 |
| 4,125,118 | A | * | 11/1978 | Rudner | 131/334 |
| 4,193,412 | A | * | 3/1980 | Heim et al. | 131/342 |
| 4,227,899 | A | * | 10/1980 | Meny et al. | 55/360 |
| 4,396,026 | A | * | 8/1983 | Grossman | 131/333 |
| 4,517,995 | A | * | 5/1985 | Lyles | 131/334 |
| 4,656,153 | A | * | 4/1987 | Wennerberg | 502/178 |
| 4,821,750 | A | * | 4/1989 | Browne | 131/340 |
| 5,083,579 | A | * | 1/1992 | Vanin et al. | 131/334 |
| 5,388,594 | A | * | 2/1995 | Counts et al. | 128/202.21 |
| 5,462,072 | A | * | 10/1995 | Browne et al. | 131/331 |
| 5,496,785 | A | * | 3/1996 | Abler | 423/210 |
| 5,502,019 | A | | 3/1996 | Augustine et al. | |
| 5,647,383 | A | * | 7/1997 | Brodof et al. | 131/331 |
| 6,209,547 | B1 | * | 4/2001 | Koller et al. | 131/331 |
| 6,224,768 | B1 | * | 5/2001 | Navarre et al. | 162/142 |
| 6,273,925 | B1 | * | 8/2001 | Alvin et al. | 55/282.2 |
| 6,342,191 | B1 | * | 1/2002 | Kepner et al. | 423/210 |

FOREIGN PATENT DOCUMENTS

| | | | |
|---|---|---|---|
| GB | 2150806 | * | 7/1985 |
| JP | 3-83571 | * | 4/1991 |
| WO | WO 99/11358 | * | 3/1999 |

OTHER PUBLICATIONS

Derwent Abstract123957 A, dated Jan. 26, 1977.*

* cited by examiner

Primary Examiner—Steven P. Griffin
Assistant Examiner—Carlos Lopez
(74) Attorney, Agent, or Firm—Burns, Doane, Swecker & Mathis, LLP

(57) ABSTRACT

A filter such as a cigarette filter having a metal reagent which selectively binds with a gaseous component of a gas stream such as tobacco smoke. The metal reagent comprises nanometer or micrometer size clusters of a transition metal or alloy containing a transition metal. The transition metal can be incorporated in an intermetallic compound such as titanium aluminide or iron aluminide. The metal clusters can be incorporated in or on a support material such as silica gel, porous carbon or a zeolite. The metal reagent can remove the gaseous component by selectively binding to unsaturated hydrocarbons such as 1,3-butadiene. The binding can occur by insertion of a metal atom of the metal reagent into a C—H bond or a C—C bond of the gaseous component.

37 Claims, 3 Drawing Sheets

US 6,848,450 B2

CIGARETTE FILTER USING INTERMETALLIC COMPOUNDS

This application claims priority under 35 U.S.C. §§ 119 and/or 365 to Provisional Application No. 60/180,681 filed in U.S. on Feb. 7, 2000 now abn.; the entire content of which is hereby incorporated by reference.

FIELD OF THE INVENTION

The invention relates to filtering of unsaturated hydrocarbons from mainstream cigarette smoke using intermetallic nano-clusters. The nano-clusters can be incorporated in cigarette filter elements in a manner which selectively removes gaseous components such as 1,3-butadiene, isoprene, toluene and the like from mainstream smoke.

BACKGROUND OF THE INVENTION

Fresh activated carbon can be used to reduce the level of 1,3-butadiene in mainstream cigarette smoke. However, because activated carbon is a broad base physical adsorbent of gaseous compounds and removes a large number of volatile and gas-phase compounds from cigarette smoke, the result can produce undesired effects on the flavor of the tobacco smoke. Selective filtration, on the other hand, has the advantage of removing targeted gaseous compounds while minimizing the effect on flavor of the tobacco smoke.

SUMMARY OF THE INVENTION

The invention relates to a filter comprising an intermetallic reagent which binds with a gaseous component of a gas stream to remove the gaseous component from the gas stream. The invention also relates to a method of manufacturing a filter which is useful for removing a gaseous component of a gas stream, comprising incorporating an intermetallic reagent in a filter, the intermetallic reagent being effective to bind with a gaseous component of a gas stream sufficiently to selectively remove the gaseous component from the gas stream. The invention further relates to a method of removing a gaseous component from a gas stream, comprising passing the gas stream in contact with a filter comprising an intermetallic reagent which binds with a gaseous component of the gas stream and removes die gaseous component from the gas stream.

The filter can comprise a cigarette filter attached to a tobacco rod by tipping paper or die intermetallic reagent can be incorporated in one or more cigarette filter parts such as filter paper, shaped paper insert, a plug, a space, or a free-flow sleeve. The intermetallic reagent can comprise nanometer or micrometer size clusters of a transition metal or alloy containing a transition metal or a transitional metal salt. The transition metal can include iron and/or titanium and the intermetallic reagent can comprise nanometer or micrometer size clusters of an iron aluminide or a titanium aluminide. Preferably, the intermetallic reagent is a non-oxide intermetallic reagent or a crystalline intermetallic reagent.

The intermetallic reagent can be incorporated in or on a support material. The support material can comprise silica gel, porous carbon or a zeolite. According to a preferred embodiment, the intermetallic reagent selectively binds to unsaturated hydrocarbons in the gas stream and selectively removes the unsaturated hydrocarbons from the gas stream. A metal atom of the intermetallic reagent can bind to a C—H bond and/or a C—C bond of the gaseous component. The gaseous component to be removed from the gas stream can be an unsaturated hydrocarbon such as 1,3-butadiene, isoprene and/or toluene.

The intermetallic reagent can be incorporated in cigarette filter paper located within a free-flow filter, the filter paper optionally having a three-dimensional shape and/or the filter paper being a liner on the interior of a hollow tubular element. The intermetallic reagent can be incorporated with cellulose acetate fibers and/or polypropylene fibers forming a plug or a free-flow filter element.

According to a method of the invention, the filter can be attached to a tobacco rod with tipping paper or the intermetallic reagent can be incorporated in one or more cigarette filter parts selected from shaped paper insert, a plug, a space or a free-flow sleeve. According to a preferred method, a step of attaching the filter paper within a free-flow filter of a cigarette can comprise forming the filter paper into a three-dimensional shape, or attaching the filter paper as a liner on the interior of a hollow tubular element, or combining the intermetallic reagent with fibers and forming a filter element from the intermetallic reagent and fibers, or combining the intermetallic reagent with cellulose and/or polypropylene fibers and forming a plug or free-flow filter element, or incorporating the intermetallic reagent in a cavity of the filter. The intermetallic reagent can be loaded in or on a support material forming a filter element of the filter.

The gas stream can be formed by burning tobacco and directing tobacco smoke through the filter or one or more filter parts such that the component of the gas stream to be removed is brought into contact with the intermetallic reagent and prevented from reentering the gas stream.

According to a preferred method, where the porous support comprises silica gel, the silica gel can have an average particle diameter of at least 10 $\mu$m or the silica gel can be in the form of particles having a mesh size of at least 60, and the gas stream can be passed through a mass of particles of the silica gel. According to a further method, the silica gel can be incorporated with cellulose acetate fibers and/or polypropylene fibers and the gas stream can be a smoke stream from a burning cigarette.

BRIEF DESCRIPTION OF THE DRAWINGS

The following detailed description of preferred embodiments makes reference to the accompanying drawings, in which.

DETAILED DESCRIPTION OF PREFERRED EMBODIMENTS OF THE INVENTION

According to the invention, small (nanometer or micrometer size) metal or metal alloy clusters can be incorporated in or on a support media (e.g., silica gel, porous carbon, zeolites, etc.) and the resulting filter material can be used to selectively bind to unsaturated hydrocarbons present in cigarette smoke. In a preferred embodiment, transition metals and metal alloys incorporated into the clusters can be used to remove gaseous components such as 1,3-butadiene from mainstream cigarette smoke as it passes through a filter containing the supported reactive metal clusters. The transition metals can include iron and titanium and alloys containing such elements such as iron alloys, titanium alloys, intermetallic compounds such as iron aluminide or titanium aluminide or transition metal salts (e.g., Cu, Fe, Zn, Al, Ce, V sulfates and/or phosphates) on high surface area support materials.

Using state-of-the-art theoretical techniques based on density functional theory and generalized gradient approximation for exchange and correlation potential, calculations of the binding energies of trans- and cis-form of butadiene to transition metal atom (Fe) as well as dimers (Fe$_2$, FeAl, and Al$_2$) were carried out. The objective of the study was to understand if (1) butadiene binds to these species and, if so, how the binding varies from one atom to another, (2) if one form of butadiene binds more strongly than the other, (3) where do the metal atoms insert and (4) if the structure of butadiene undergoes geometrical transformation as it binds to metal atoms. The study was carried out to see if suitable traps can be found for this organic molecule and to suggest experiments to prove the theoretical predictions.

Figure 1A:
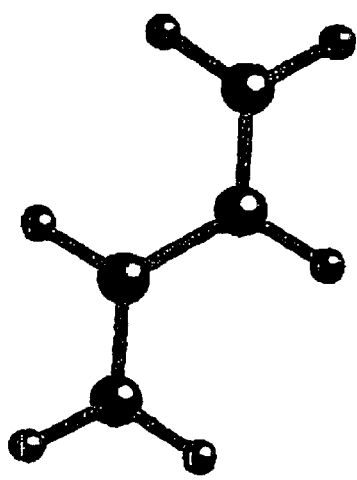
FIG. 1 shows the trans form of butadiene and the bonding of Fe and $Fe_2$, FeAl and $Al_2$ dimers to the trans form of butadiene.
Figure 1B:
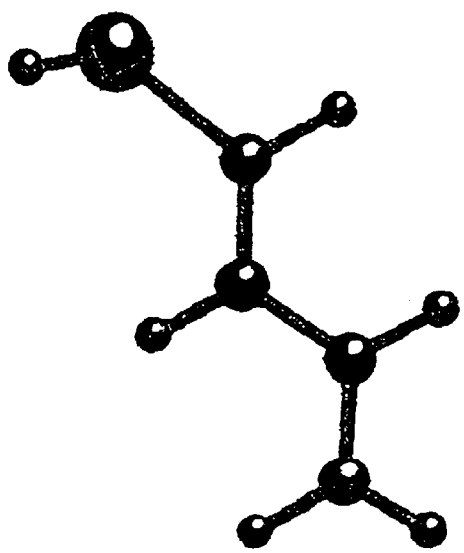

(1) Geometry of Cis- and Trans-butadiene as they Interact with Metal Atoms and Dimers In FIG. 1(a) the trans form of butadiene is given. It is a planar molecule. An Fe atom inserts into the C—H bond and gains an energy of 0.37 eV (see Table 1) over an isolated trans-butadiene and Fe atom. While interacting with the cis-form (FIG. 2), the Fe atom, on the other hand, attaches to the C—C double bond and the structure becomes three-dimensional. Energetically, the Fe-butadiene complex in the cis-form is more stable than the trans-form by 0.78 eV. This is particularly interesting as the trans- and cis-forms of butadiene are energetically nearly degenerate. Addition of Fe does seem to break this degeneracy.

Figure 1C:
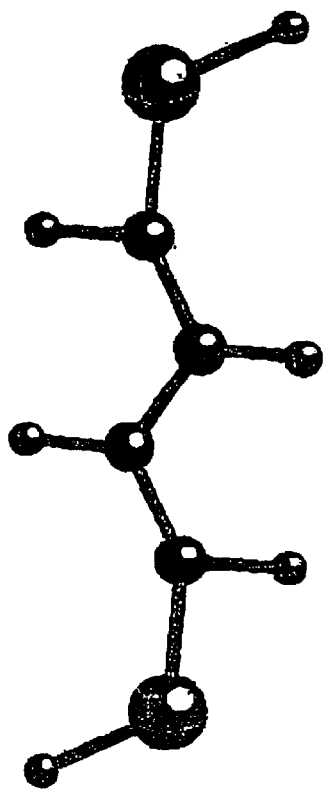
Figure 1D:
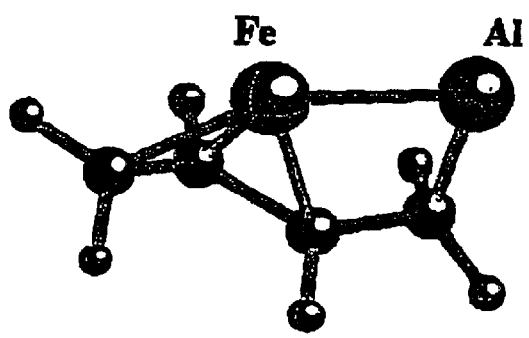
Figure 1E:
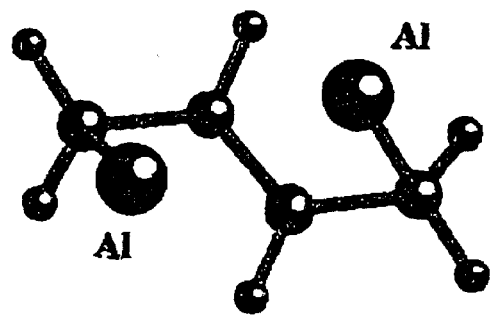
Figure 2A:
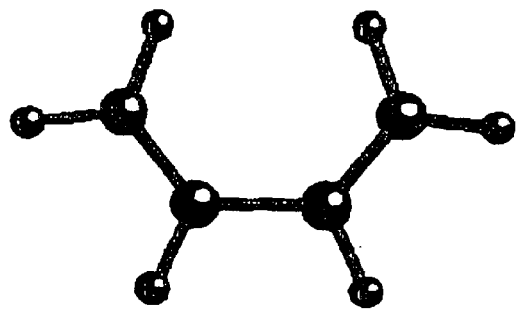
FIG. 2 shows the cis form of butadiene and the bonding of Fe, FeAl and $Al_2$ to the cis form of butadiene.
Figure 2B:
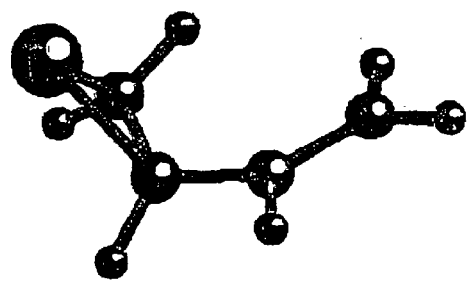
Figure 2C:
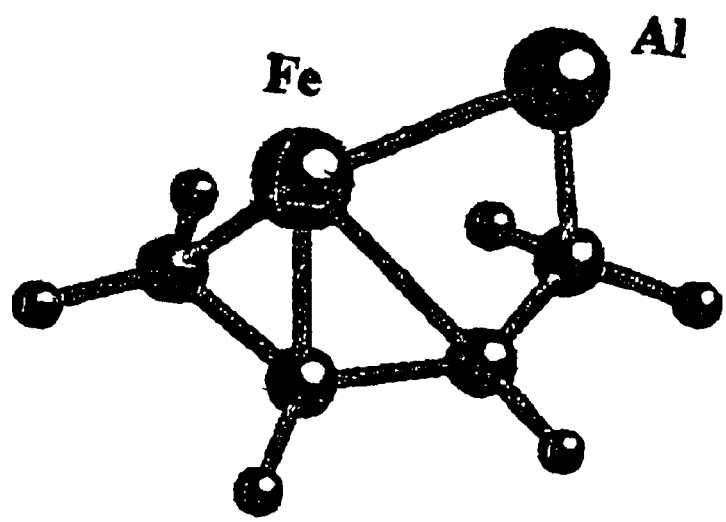
Figure 2D:
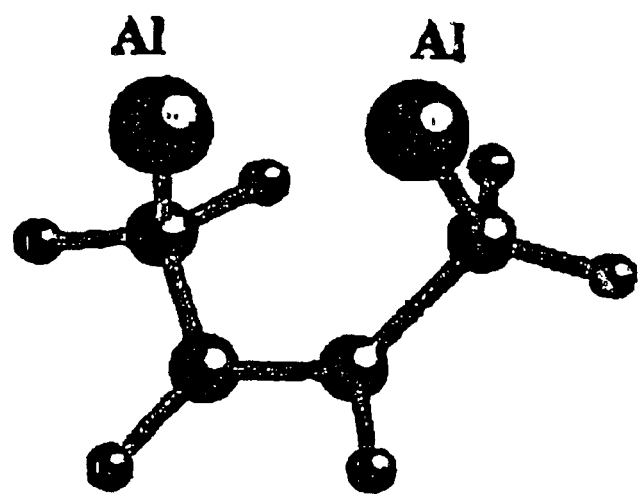

Fe$_2$ does not bind to the trans- or cis-form of butadiene (FIG. 1(c)) as energetically this is higher than dissociated Fe$_2$ and butadiene. FeAl and Al$_2$ dimers, on the other hand, bind strongly to both the trans- and cis-forms of butadiene. While the bond between Fe and Al remains intact (see FIGS. 1(d) and 2(c)), that between Al and Al breaks (see FIGS. 1(e) and 2(d)). This is because the Fe—Al bond is stronger than the Al—Al bond. Nevertheless, a binding energy in excess of 1 eV between a metal dimer and butadiene is sufficient. The C—C and C—H bonds in butadiene do not change appreciably as metal atoms are bound to the molecule.

(2) Binding of Metal Atoms to C$_2$ and C—H Dimers

From the above discussion it is apparent that a metal atom either inserts into the C—H bond or attaches to a C—C bond in butadiene. As calculations presented in FIG. 1 and FIG. 2 and Table 1 are very complex and costly, the systematics of transition metal binding to CH and C$_2$ molecules was studied to see which atoms can possibly bond more strongly to butadiene than Fe. The corresponding energies are given in Table 2. The data indicates that Sc, Ti, V, Co, and Ni are better candidates than Fe whether they prefer to insert into the CH bond or attach to C—C bond. Calculations of Sc, Ti, V, Co, and Ni interacting with the complete butadiene molecule can be carried out to prove this hypothesis. Experimental studies of transition metal atoms and Al reacting with butadiene in the gas phase can also be carried out.

TABLE 1

| System | Binding Energy (eV) | |
|---|---|---|
| | Trans (FIG. 1) | Cis (FIG. 2) |
| C$_4$H$_6$ | 43.98 | 43.82 |
| C$_4$H$_6$Fe | 0.37 | 1.15 |
| C$_4$H$_6$Fe$_2$ | — | — |
| C$_4$H$_6$FeAl | 1.35 | 1.76 |
| C$_4$H$_6$Al$_2$ | 2.22 | 2.03 |

$E_b(C_4H_6) = E(C_4H_6) - 4E(C) - 6E(H)$
$E_b(C_4H_6Fe) = E(C_4H_6Fe) - E(C_4H_6) - E(Fe)$
$E_b(C_4H_6FeAl) = E(C_4H_6FeAl) - E(C_4H_6) - E(FeAl)$
$E_b(C_4H_6Al_2) = E(C_4H_6Al_2) - E(C_4H_6) - E(Al_2)$
$E_b(Al_2) = E(Al_2) - 2E(Al) = 1.76$ eV
$E_b(FeAl) = E(FeAl) - E(Fe) - E(Al) = 2.53$ eV
E = total energy, kE$_b$ = binding energy

TABLE 2

Energetics of M—C$_2$ and M—CH (M = Sc . . . Ni) in eV

| M | E$_b$(MC$_2$) | E$_b$(MCH) |
|---|---|---|
| Sc | 6.76 | 9.02 |
| Ti | 6.95 | 6.21 |
| V | 7.28 | 4.95 |
| Cr | 4.37 | 4.08 |
| Mn | 5.03 | 3.61 |
| Fe | 4.86 | 4.68 |
| Co | 6.16 | 5.45 |
| Ni | 6.74 | 5.79 |

$E_b(MC_2) = E(MC_2) - E(M) - E(C_2)$
$E_b(MCH) = E(MCH) - E(M) - E(CH)$

Clusters of nanosize intermetallic powders such as Fe$_3$Al, FeAl, TiAl, NiAl and Ni$_3$Al can be obtained by melting and atomization techniques. They can be processed by laser evaporation, and or chemical decomposition techniques. The powders can be produced in inert atmospheres such as argon or helium, or by bleeding a certain amount of oxygen, nitrogen, or ammonia to alter the surface property of the powders. The sizes of the particles may be altered by the residence time of the laser pulse, cooling time, temperature, etc. For instance, it is possible to synthesize nanoparticles of controlled size and composition using pulsed laser vaporization with controlled condensation (LVCC) in a diffusion cloud chamber under well-defined conditions of temperature and pressure.

While the invention has been described in detail with reference to specific embodiments thereof, it will be apparent to those skilled in the art that various changes and modifications can be made, and equivalents employed, without departing from the scope of the appended claims.

What is claimed is:

1. A cigarette filter comprising an intermetallic compound reagent which binds with a gaseous component of a gas stream to remove said gaseous component from said gas stream.

2. The cigarette filter according to claim 1, wherein the cigarette filter is attached to a tobacco rod by tipping paper or the intermetallic compound reagent is incorporated in one or more cigarette filter parts selected from the group consisting of shaped paper insert, a plug, a space, or a free-flow sleeve.

3. The cigarette filter according to claim 1, wherein the intermetallic compound reagent selectively binds to unsaturated hydrocarbons in the gas stream.

4. The cigarette filter according to claim 1, wherein the intermetallic compound reagent comprises nanometer or micrometer size clusters of a transition metal or alloy containing a transition metal or a transitional metal salt.

5. The cigarette filter according to claim 1, wherein the gaseous component to be removed from said gas stream is 1,3-butadiene.

6. The cigarette filter according to claim 4, wherein said intermetallic compound reagent is incorporated in cigarette filter paper located within a free-flow filter, the filter paper optionally having a three-dimensional shape and/or the filter paper being a liner on the interior of a hollow tubular element.

7. The cigarette filter according to claim 1, wherein said intermetallic compound reagent is incorporated with cellulose acetate fibers and/or polypropylene fibers forming a plug at a free-flow filter element.

8. The cigarette filter according to claim 4, wherein said intermetallic compound reagent is incorporated in or on a support material.

9. The cigarette filter according to claim 8, wherein said support material comprises silica gal, porous carbon or a zeolite.

10. The cigarette filter according to claim 4, wherein said transition metal includes iron and/or titanium.

11. The cigarette filter according to claim 1, wherein said intermetallic compound reagent comprises nanometer or micrometer size clusters of an iron aluminide or a titanium aluminide.

12. The cigarette filter according to claim 1, wherein a metal atom of the intermetallic compound reagent binds to a C—H bond and/or a C—C bond of the gaseous component.

13. A method of manufacturing a cigarette filter which is useful for removing a gaseous component of a gas stream, comprising incorporating an intermetallic compound reagent in a cigarette filter, the intermetallic compound reagent being effective to bind with a gaseous component of a gas stream sufficiently to selectively remove the gaseous component from the gas stream.

14. The method according to claim 13, further comprising attaching the cigarette filter to a tobacco rod with tipping paper or the intermetallic compound reagent is incorporated in one or more cigarette filter parts selected from the group consisting of shaped paper insert, a plug, a space, or a free-flow sleeve.

15. The method according to claim 14, further comprising attaching the filter paper within a free-flow filter of a cigarette such as by forming said filter paper into a three-dimensional shape or attaching said filter paper as a liner on the interior of a hollow tubular element or combining said intermetallic compound reagent with fibers and forming a filter element from said intermetallic compound reagent and fibers or combining said intermetallic compound reagent with cellulose and/or polypropylene fibers and forming a plug or free-flow filter element or incorporating said intermetallic compound reagent in a cavity of said filter.

16. The method according to claim 13, wherein the intermetallic compound reagent is effective for removing unsaturated hydrocarbons including 1,3-butadiene, isoprene and/or toluene from the gas stream.

17. The method according to claim 13, wherein the intermetallic compound reagent comprises nanometer or micrometer size clusters of a transition metal or alloy containing a transition metal or a transitional metal salt.

18. The method according to claim 17, further comprising a loading said intermetallic compound reagent in or on a support material forming a filter element of the cigarette filter.

19. The method according to claim 13, wherein the support material comprises silica gel, porous carbon or a zeolite.

20. A method of removing a gaseous component from a gas stream, comprising passing the gas stream in contact with a cigarette filter comprising an intermetallic compound reagent which binds with a gaseous component of the gas stream and removes said gaseous component from the gas stream.

21. The method according to claim 20, further comprising steps of forming the gas stream by burning tobacco and directing tobacco smoke through the cigarette filter such that the component of the gas stream to be removed is brought into contact with the intermetallic compound reagent and prevented from reentering the gas stream.

22. The method according to claim 21, wherein the intermetallic compound reagent is incorporated in one or more cigarette filter parts selected from the group consisting of filter paper, shaped paper insert, a plug, a space, or a free-flow sleeve, the tobacco smoke being passed through the one or more filter parts.

23. The method according to claim 20, wherein the intermetallic compound reagent is effective to selectively remove unsaturated hydrocarbons present in the gas stream.

24. The method according to claim 20, wherein the intermetallic compound reagent comprises nanometer or micrometer size clusters of a transition metal or alloy containing a transition metal or a transitional metal salt.

25. The method according to claim 20, wherein the cigarette filter removes 1,3-butadiene from the cigarette smoke.

26. The method according to claim 20, wherein the intermetallic compound reagent is incorporated in or on a support material selected from the group consisting of silica gel, porous carbon and a zeolite.

27. The method according to claim 26, wherein said silica gel has an average particle diameter of at least 10 $\mu$m or sold silica gel is in the form of particles having a mesh size of at least 60 and said gas stream passed through a mass of particles of said silica gel.

28. The method according to claim 26, wherein said silica gel is incorporated with cellulose acetate fibers and/or polypropylene fibers and the gas stream is a smoke stream from a burning cigarette.

29. The method according to claim 20, wherein a metal atom of the intermetallic compound reagent binds to a C—H bond and/or a C—C bond of the gaseous component.

30. The filter according to claim 1, wherein the intermetallic compound reagent is a non-oxide intermetallic compound reagent or a crystalline intermetallic compound reagent.

31. The method according to claim 13, wherein the intermetallic compound reagent is a non-oxide intermetallic compound reagent or a crystalline intermetallic compound reagent.

32. The cigarette filter according to claim 1, wherein the intermetallic compound reagent comprises nanometer or micrometer size clusters of a transition metal or alloy containing a transition metal or a transitional metal salt.

33. The method according to claim 20, wherein intermetallic compound reagent is incorporated in or on a support material selected from the group consisting of silica gel, porous carbon and a zeolite, or a said silica gel is in the form of particles and the gas stream is passed through a mass of particles of the silica gel.

34. The method according to claim 20, wherein the metal reagent is incorporated in or on a support material selected from the group consisting of silica gel, porous carbon and a zeolite.

35. A cigarette, comprising:

the cigarette filter according to claim 1; and a tobacco rod attached to the filter by tipping paper.

36. A cigarette, comprising:

the cigarette filter according to claim 4; and a tobacco rod attached to the filter by tipping paper.

37. A cigarette, comprising:

the cigarette filter according to claim 11; and a tobacco rod attached to the filter by tipping paper.

* * * * *